United States Patent
Prakash

(10) Patent No.: US 10,540,163 B2
(45) Date of Patent: Jan. 21, 2020

(54) SYSTEM AND METHOD FOR AUTOMATIC DEPLOYMENT OF APPLICATIONS IN AN INTEGRATED DEVELOPMENT ENVIRONMENT

(71) Applicant: Wipro Limited, Bangalore (IN)

(72) Inventor: Rathinasabapathy Prakash, Thiruchengodu (IN)

(73) Assignee: Wipro Limited, Bangalore (IN)

( * ) Notice: Subject to any disclaimer, the term of this patent is extended or adjusted under 35 U.S.C. 154(b) by 76 days.

(21) Appl. No.: 15/418,846

(22) Filed: Jan. 30, 2017

(65) Prior Publication Data
US 2018/0165086 A1    Jun. 14, 2018

(30) Foreign Application Priority Data
Dec. 8, 2016 (IN) .............................. 201641042044

(51) Int. Cl.
| | | |
|---|---|---|
| *G06F 9/44* | (2018.01) | |
| *G06F 8/65* | (2018.01) | |
| *G06F 8/34* | (2018.01) | |
| *H04L 29/08* | (2006.01) | |

(52) U.S. Cl.
CPC ................ *G06F 8/65* (2013.01); *G06F 8/34* (2013.01); *H04L 67/34* (2013.01)

(58) Field of Classification Search
CPC ... G06F 8/65; G06F 8/34; G06F 8/656; G06F 8/33; H04L 67/34
USPC ....................................................... 717/172
See application file for complete search history.

(56) References Cited

U.S. PATENT DOCUMENTS

| | | | |
|---|---|---|---|
| 6,145,012 A * | 11/2000 | Small ..................... | H04L 67/06 709/204 |
| 7,966,495 B2 | 8/2011 | Dekel et al. | |
| 8,225,311 B1 | 7/2012 | Robertson et al. | |
| 8,327,351 B2 * | 12/2012 | Paladino ................... | G06F 8/71 717/106 |
| 2004/0068523 A1 * | 4/2004 | Keith, Jr. ............ | G06F 16/1787 |

(Continued)

OTHER PUBLICATIONS

Website, http://www.ibm.com/support/knowledgecenter/SSAW57_8.0.0/com.ibm.websphere.rid.doc/info/ae/ae/trun_app_hotupgrade_ejb.html. BM Knowledge Center—Changing or adding EJB JAR files, 2 pages.

(Continued)

*Primary Examiner* — Anna C Deng
(74) *Attorney, Agent, or Firm* — Finnegan, Henderson, Farabow, Garrett & Dunner, LLP

(57) ABSTRACT

Disclosed herein is a method and an automatic redeployment agent for automatic redeployment of applications in an integrated Development Environment (IDE). The automatic redeployment agent loads all changes in codebase of the applications onto an application Enterprise Archive (EAR) on the server, by sequentially validating directory paths in the application codebase and the application EAR. The changes in the application codebase are instantly reflected on the server application without restarting or redeploying the server. The automatic redeployment agent helps in reducing the deployment and server restart turnaround time for the IDE by instantly loading the changes to the server. Also, the overall productivity of the IDE is enhanced due to significant reduction in the efforts required for deployment and/or redeployment of the application.

12 Claims, 7 Drawing Sheets

(56) References Cited

U.S. PATENT DOCUMENTS

2012/0265836 A1* 10/2012 Nemoto ............ G06F 17/30153
                                                    709/211
2013/0332916 A1* 12/2013 Chinn ....................... G06F 8/65
                                                    717/169
2016/0283214 A1*  9/2016 Hill ..................... G06F 17/3023

OTHER PUBLICATIONS

Extended European Search Report issued in the European Patent Office in counterpart European Application No. 17159933.5, dated Sep. 27, 2017, 9 pages.

* cited by examiner

I. Before redeployment 301

II. Addition of a new directory 303

III. After automated redeployment process 305

I. Before redeployment 309

II. After automated redeployment process 311

I. Before redeployment 313

II. Deletion of Directory 315

III. After automated redeployment process 317

SYSTEM AND METHOD FOR AUTOMATIC DEPLOYMENT OF APPLICATIONS IN AN INTEGRATED DEVELOPMENT ENVIRONMENT

TECHNICAL FIELD

The present subject matter is related, in general to process redeployment, and more particularly, but not exclusively to a system and a method for automatic redeployment of applications in an Integrated Development Environment (IDE).

BACKGROUND

Generally, when a web application is in its implementation phase or coding phase, and if a developer of such a web application wants to effectuate changes in the web server, then the developer must essentially either redeploy or restart the server. The server must be redeployed each time whenever the developer wishes to implement some modifications in the application.

On an average, the activity of initiating such redeployment/restart of the server consumes about 3-5 mins and the accomplishment of such a task may also go up to 5-10 mins. This can be a major issue of compatibility and efficiency of the web application when new instances of the application must be pushed into the application as a form of implementation or change. In a general development environment, the redeployment activities may have to be performed for at least a minimum of 20 times a day, to reflect all the required implementations/changes on the application. As an example, if a machine being used by the developer is taking 5 minutes per each deployment, the developer shall be spending a total of 1 hour 40 minutes per day for the deployment activities to complete. Due to this, the productivity of the developer gets affected, and the overall development process gets delayed.

The existing approaches and tools for carrying out deployment and redeployment of web applications/content of the web application are time consuming and hamper the efficiency of the human resources as they wait for the machine to compile through the implementations. One of the existing approach focuses on 'time stamps' of the files to determine changes before for deployment of each change in the implementation. However, such an approach can be burdening in cases where the time stamp may change, but the content of the file has not changed, thereby pushing the unchanged time stamp file for deployment.

The challenges mainly faced during automatic redeployment of the applications in an IDE include determining modifications in the development environment in real-time, and implementing the modifications on the server without restarting/redeploying the server.

SUMMARY

Disclosed herein is a method for automatic redeployment of the applications in an Integrated Development Environment (IDE). The method comprises retrieving, by an automatic redeployment agent, one or more directory paths of one or more files related to the application from a development code repository, associated with the IDE in a user system, and a server file repository in a server associated with the IDE. Upon retrieving the required directory path, each of the one or more directory paths in the development code repository are compared with each of the one or more directory paths in the server file repository. Further, one or more changes in at least one of the one or more directory paths in the development code repository are determined based on the comparison. Finally, the one or more directory paths in the server file repository are updated based on the one or more changes in at least one of the one or more directory paths in the development code repository.

Further, the present disclosure discloses an automatic redeployment agent for automatic redeployment of the applications in an Integrated Development Environment (IDE), the automatic redeployment agent comprising a processor and a memory. The memory may be communicatively coupled to the processor, wherein the memory stores processor-executable instructions. The instruction, upon execution causes the processor to retrieve one or more directory paths of one or more files related to the application from a development code repository, associated with the IDE in a user system, and a server file repository in a server associated with the IDE. Further, the instruction cause the processor to compare each of the one or more directory paths in the development code repository with each of the one or more directory paths in the server file repository. Upon comparison of the one or more directory paths, the instructions cause the processor to determine one or more changes in at least one of the one or more directory paths in the development code repository based on the comparison. Finally, the instructions further cause the processor to update the one or more directory paths in the server file repository based on the one or more changes in at least one of the one or more directory paths in the development code repository.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
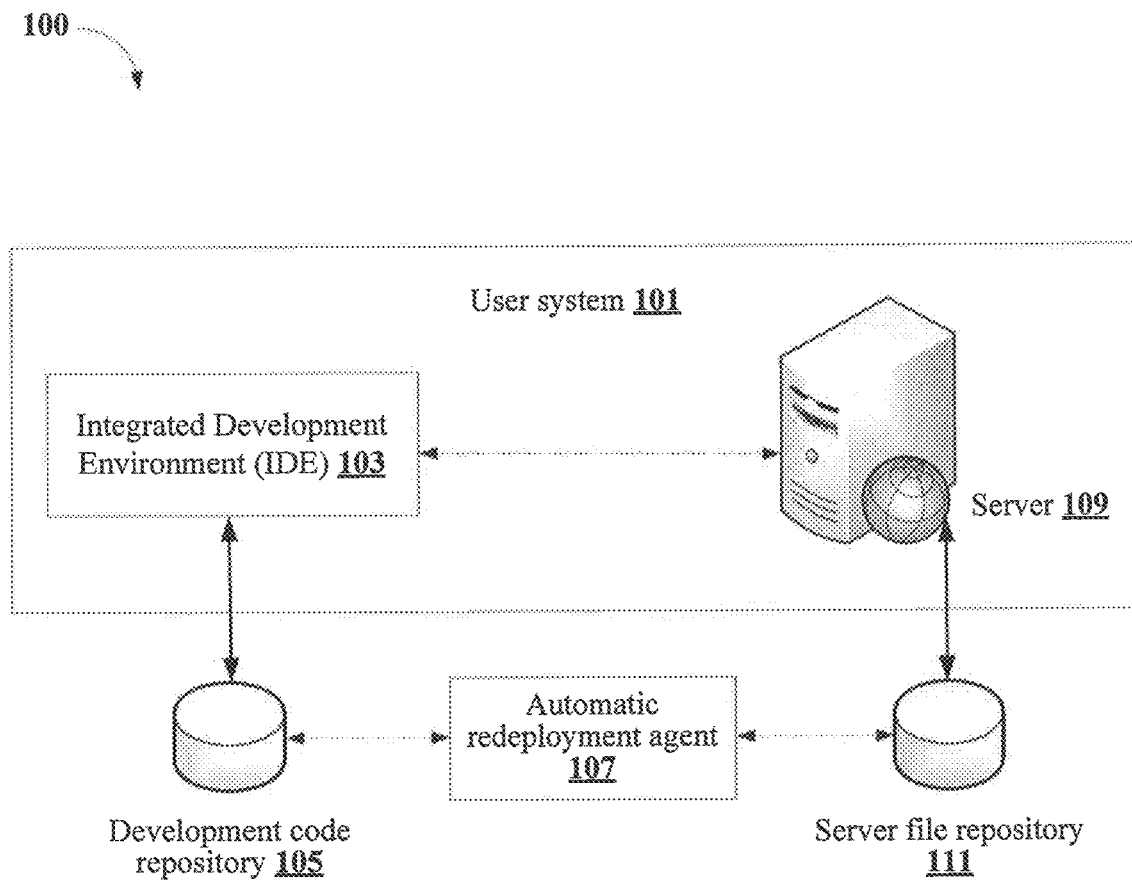
FIG. 1 shows an exemplary environment for automatic redeployment of applications in an Integrated Development Environment (IDE), in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown or not.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an automatic redeployment agent for automatic redeployment of applications in an IDE. In an implementation, the automatic redeployment agent may be implemented as a plug-in for the IDE tools. The automatic redeployment agent helps in decreasing the deployment and server restart turnaround time by instantly loading the changes into an Enterprise Application Archive (EAR) on the server. Any changes/ modifications in the codebase of the application will be reflected, without restarting or redeploying the server.

In an embodiment, the automatic redeployment agent may load all the changes in the file repository/codebase of the application onto the EAR after the files are saved in pursuance to the changes made. The automatic redeployment agent follows a validation process for loading the changes onto the EAR. The validation process occurs in a sequential manner, where the automatic redeployment agent firstly checks on the directory paths in the codebase and the directory paths at the EAR. If there are any new directory paths added in the codebase of the application, which is not present in the EAR, then the automatic redeployment agent updates the newly added directory in the EAR.

Similarly, if there are directory paths which are found to be deleted from the codebase, then the automatic redeployment agent deletes such a directory from the EAR. Further, the automatic redeployment agent may read individual files in the codebase, as well as in the EAR to make a one-to-one match for values of each of the files based on the directory paths. If the values are found to be different for a given directory path, then only the modified contents of the changed file shall be copied and pasted into the corresponding file in the EAR. The automatic redeployment agent may not perform any action if there are no changes in the values of any of the files.

Thus, the automatic redeployment agent disclosed in the present disclosure may be used for automatically redeploying the applications in the IDE. The method helps in reducing the deployment and server restart turnaround time by instantly loading the changes to the server. Also, the overall productivity of the IDE is enhanced due to significant reduction in the efforts required for deployment and/or redeployment of the application. Further, the method may also result in optimal usage of resources in the IDE, thereby reducing the cost of development and deployment of applications. The automatic redeployment agent may be used across various development platforms, including in the deployment of Java J2EE related projects and applications.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for automatic redeployment of applications in an Integrated Development Environment (IDE) using an automatic redeployment agent configured in the IDE.

An Integration Development Environment (IDE) 103 is a platform that provides comprehensive facilities to computer programmers and developers for developing software and/or applications. In an embodiment, the IDE 103 may be associated with a server 109 in the user system 101. As an example, the user system 101 may be a generic computing system which is used by the developer for developing, deploying and modifying one or more applications in the IDE 103. The IDE 103 may store one or more files and directories related to the development of the applications in a development code repository 105.

In an embodiment, the server 109 associated with the IDE 103 may be a webserver, for example, Apache® webserver, WebSphere application server or Microsoft® Internet Information Server (IIS), that provides an access to the one or more applications being developed in the IDE 103. The server 109 comprises a server file repository 111 that stores various files and directories required for deployment of the one or more applications on the server 109. In an embodiment, the server file repository 111 may comprise an Enterprise Application Archive (EAR) (not shown in FIG. 1), which may be used for packaging one or more modules of the application into a single archive so that the deployment of the various modules onto the server 109 is established. Further, an EAR application configured in the server 109 may receive one or more changes to be made into the application running on the server 109 and packages the one or more changes into the EAR format for deploying the one or more changes on the application at the server 109. Further, the server file repository 111 maintains one or more directories of files corresponding to a running instance of the one or more applications.

In an embodiment, the automatic redeployment agent 107 may be configured as a plugin to the IDE 103 in the user system 101. The automatic redeployment agent 107 may monitor and track each of the one or more changes being made to the one or more applications at the IDE 103. Whenever a redeployment process is initiated at the IDE 103, the automatic redeployment agent 107 starts reading the one or more directories and files at the development code repository 105 and the server file repository 111 at the EAR. Further, the automatic redeployment agent 107 retrieves the one or more directory paths from the development code repository 105 and the server file repository 111 for identifying the one or more files and directories that have been changed in the development code repository 105. The changes in the one or more files and directories in the development code repository 105 may be identified by comparing each of the one or more directory paths retrieved from the development code repository 105 with that of the server file repository 111.

Finally, upon determining the one or more changes in the one or more directory paths in the development code repository 105, the automatic redeployment agent 107 updates each of the one or more changes at the development code repository 105 onto the server file repository 111 in the server 109.

Figure 2:
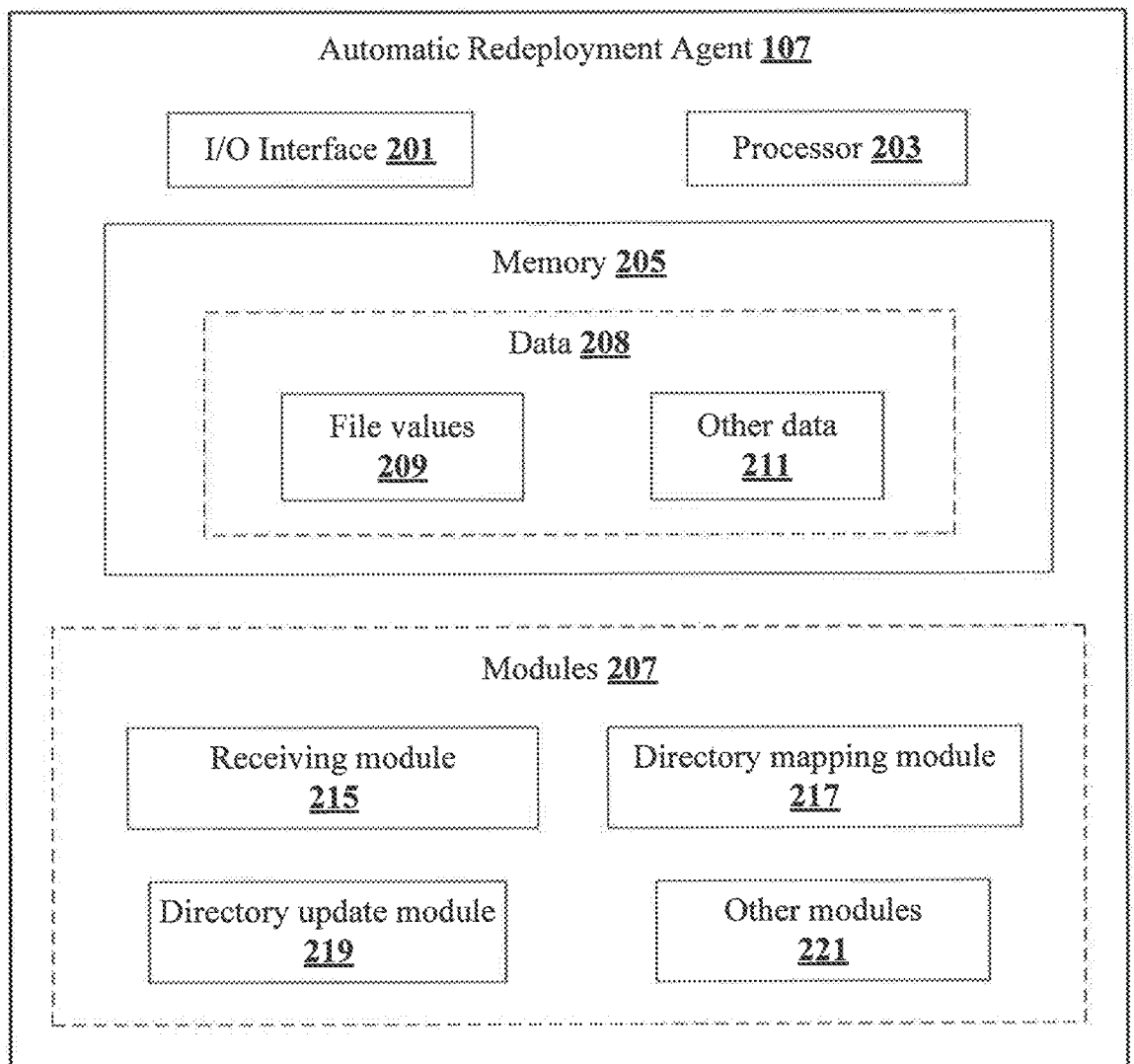
FIG. 2 shows a detailed block diagram illustrating an automatic redeployment agent used for automatic redeployment of applications in the IDE in accordance with some embodiments of the present disclosure.

FIG. 2 shows a detailed block diagram illustrating an automatic redeployment agent 107 used for automatic redeployment of applications in the IDE in accordance with some embodiments of the present disclosure.

The automatic redeployment agent 107 comprises an I/O interface 201, a processor 203 and a memory 205. The I/O interface 201 may be configured to read and retrieve the one or more directory paths from the development code repository 105 and the server file repository 111. The memory 205 may be communicatively coupled to the processor 203. The processor 203 may be configured to perform one or more functions of the automatic redeployment agent 107 for automatically redeploying the applications on the IDE 103. In one implementation, the automatic redevelopment agent 103 may comprise data 208 and modules 207 for performing various operations in accordance with the embodiments of the present disclosure. In an embodiment, the data 208 may be stored within the memory 205 and may include, without limiting to, file values 209 and other data 209.

In some embodiments, the data 208 may be stored within the memory 205 in the form of various data structures. Additionally, the data 208 may be organized using data models, such as relational or hierarchical data models. The other data 211 may store data, including temporary data and temporary files, generated by modules 207 for performing the various functions of the automatic redeployment agent 107.

In some embodiments, the file values 209 are values associated with each of the one or more files in the development code repository 105 and server file repository 111. The file values 209 are obtained based on contents of each file. As an example, every character in the content of the file may be assigned with a numeric value, and the file value 209 may be obtained as a sum of the numeric values assigned to each character in the file. In an embodiment, the file values 209 associated with the one or more files may change whenever there is a change in the content of the one or more files. In some embodiments, the file values 209 may be stored in the form of a table within the memory 205 of the automatic redeployment agent 107.

In some embodiment, the data 208 may be processed by one or more modules 207 of the automatic redeployment agent 107. In some implementation, the one or more modules 207 may be stored as a part of the processor 203. In another implementation, the one or more modules 207 may be communicatively coupled to the processor 203 for performing one or more functions of the automatic redeployment agent 107. The modules 207 may include, without limiting to, a receiving module 215, a directory mapping module 217, a directory update module 219 and other modules 221.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 221 may be used to perform various miscellaneous functionalities of the automatic redeployment agent 107. It will be appreciated that such modules 207 may be represented as a single module or a combination of different modules.

In some embodiment, the receiving module 215 may be responsible for retrieving one or more directory paths from the development code repository 105 and the server file repository 111. The receiving module 215 interacts with the development code repository 105 forough the I/O interface 201 and retrieves a copy of the paths of one or more files and directories saved in the development code repository 105, including details and/or paths of files and directories that are recently updated in the development code repository 105. Similarly, the receiving module 215 communicates with the EAR in the server file repository 111 and retrieves, forough the I/O interface 201, a copy of the one or more files and directories that are being used for the deployment of the application on the server 109.

In some embodiment, the directory mapping module 217 may be responsible for comparing the one or more changes in the directory paths of the one or more files and directories stored in the development code repository 105 with the directory paths of the one or more files and directories stored in the server file repository 111. The one or more directory paths may be compared using a sequential validation processes as explained below:

Addition Validation:

The one or more directory paths in the development code repository 105 are mapped with the one or more directory paths in the server file repository 111 to identify addition of new directories and/or files along the existing directory paths. If there is an addition of directory and/or file, the appropriate new directory and/or file must be added to the server file repository 111.

Deletion Validation:

Upon comparison of the one or more directory paths, if there is a directory path which is reduced and/or deleted out of the development code repository 105, then the appropriate deleted file and/or directory must be deleted from the server file repository 111.

Update Validation:

In some embodiment, the one or more directory paths may remain unchanged even when there are some chances in the contents of the one or more files within the one or more directories. Hence, in such scenarios, upon comparing the one or more directory paths, if there are no changes in the one or more directory paths, then the directory mapping module 217 may optionally compare the file values 209 of the one or more files within the one or more directories for identifying one or more changes in the contents of the one or more files. If the file value 209 of the one or more files has changed along any of the one or more directory paths, then only the modified contents of the file having a change in the file value 209 are copied from development code repository 105 and replaced onto the server file repository 111. On the other hand, if there are no changes in the values of any of the files, no actions are performed by the automatic redeployment agent 107.

In some embodiment, the one or more directory paths in the server file repository 111 are updated at one or more predetermined time intervals or upon determining the one or more changes in at least one of the one or more directory paths in the development code repository 105.

In an embodiment, the directory update module 219 is responsible for updating the one or more changes in the server file repository 111 based on the one or more changes in the development code repository 105. If there are any new directories or files added in the development code repository 105, which is not present in server file repository 111, then the appropriate newly added directories or files are added in the server file repository 111. Similarly, if there are any directory paths which are reduced out of the development code repository 105, then the appropriate deleted directories and files are deleted from the server file repository 111. In an embodiment, updating each of the one or more changes onto the server file repository 111 is performed by replacing only the modified contents of the file whose file value 209 has been changed in the development code repository 105, during the runtime of the server 109.

Figure 3A:
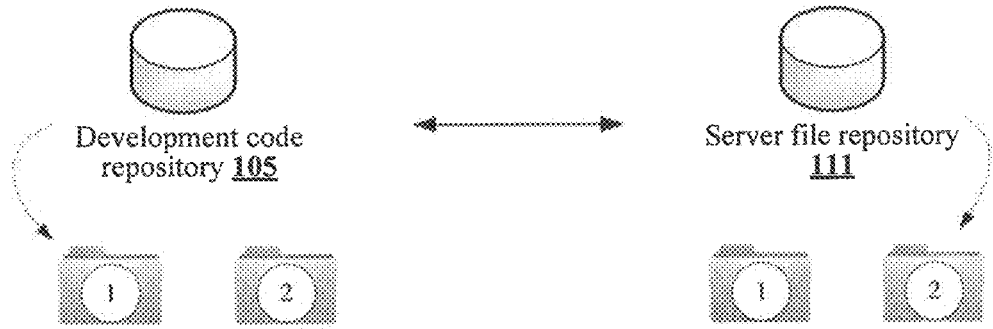
FIG. 3A illustrates a process for automatic redeployment of the application upon addition of a new directory and/or one or more new files in accordance with few embodiments of the present disclosure.
Figure 3A:
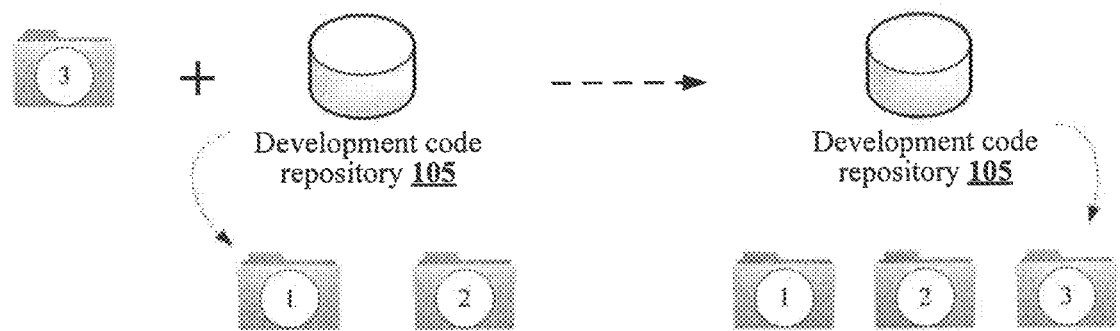
Figure 3A:
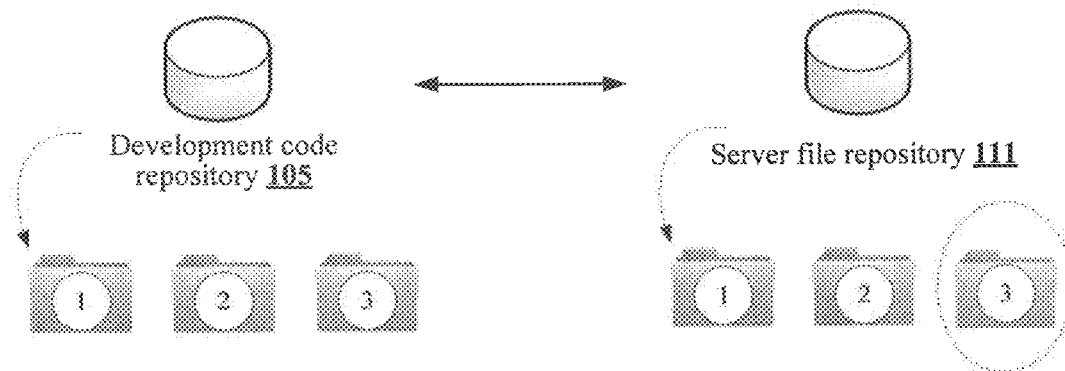

FIG. 3A illustrates a process for automatic redeployment of the application upon addition of a new directory in accordance with few embodiments of the present disclosure.

Step 301 of FIG. 3A shows the one or more directories in the development code repository 105 before initiating the redeployment process. Initially, both the development code repository 105 and the server file repository 111 comprise same set of directories, namely 'Directory 1' and 'Directory 2' and may have the same directory path as indicated below:

ARP:/Home/Directory 1/Directory 2

In some embodiments, as shown in step 303, a new directory, 'Directory 3' comprising one or more new files may be added onto the development code repository 105, for example whenever the developer wants to add new functionalities to the application. As soon as 'Directory 3' is added in the development code repository 105, a redeployment process may be initiated at the riser system 101. Also, the directory path at the development code repository 105 may be changed as indicated below:

ARP:/Home/Directory 1/Directory 2/Directory 3

Upon initiation of the redeployment process, as shown in step 305, the automatic redeployment agent 107 may add 'Directory 3', along with the one or more files comprised in 'Directory 3', in the appropriate directory path in the server file repository 111 to maintain same set of directories and/or files on the server file repository 111 and thereby reflecting the changes in the application at the server. Hence, after 'Directory 3' is added in the server file repository 111, the directory path at the server file repository 111 would change as indicated below:

ARP:/Home/Directory 1/Directory 2/Directory 3

Figure 3B:
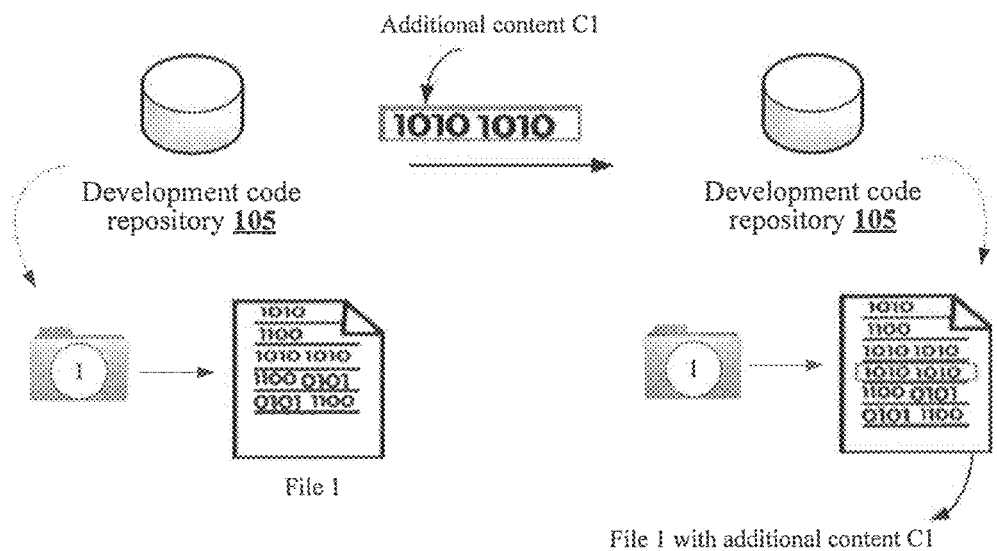
FIG. 3B illustrates a process for automatic redeployment of the application upon updating content of a file in the application in accordance with few embodiments of the present disclosure.
Figure 3B:
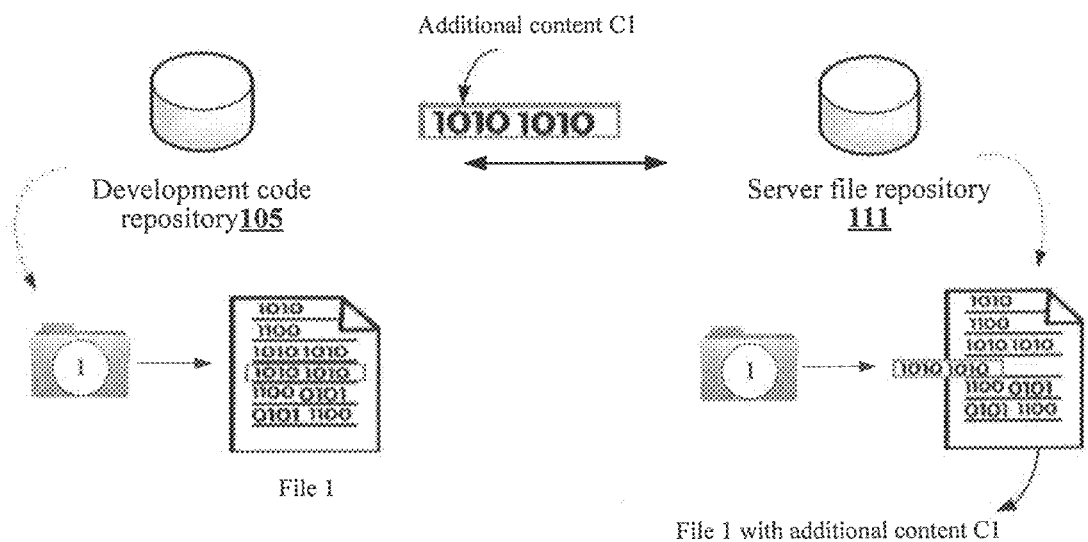

FIG. 3B illustrates a process for automatic redeployment of the application upon updating content of a file in the application in accordance with few embodiments of the present disclosure.

In an embodiment, when there are no changes in the paths of directories in the development code repository 105 and the server file repository 111, the automatic redeployment agent 107 may compare the file values 209 of each of the one or more files in the development code repository 105 and the server file repository 111 for identifying one or more changes made to the contents of the one or more files. The values of the one or more files in the development code repository 105 may change based on the one or more changes in contents of the one or more files in the development code repository 105. Further, the values of the one or more files in the server file repository 111 may be updated by copying only the changed contents of the one or more files in the development code repository 105 into the one or more files in the server file repository 111.

The content of an existing a file in the development code repository 105 may be changed for carrying out one or more changes in the application. As an example, an additional line of code may be inserted into the existing file to implement an additional functionality into the application. As shown in step 309 of FIG. 3B, an existing file, 'File 1' in the 'Directory 1' of the development code repository 105 may be updated with an additional content 'C1' to include an additional functionality into the application. Further, as indicated in step 311, the automatic redeployment agent 107 may copy only the additional content 'C1', which is updated in 'File 1' and replicate it onto the equivalent file in the server file repository 111. Thereby, the automatic redeployment agent 107 keeps the server file repository 111 in sync with the development code repository 105 and ensures that the one or more changes made to the application on the IDE 103 are reflected in a running instance of the application being run on the server 109 in real-time.

Figure 3C:
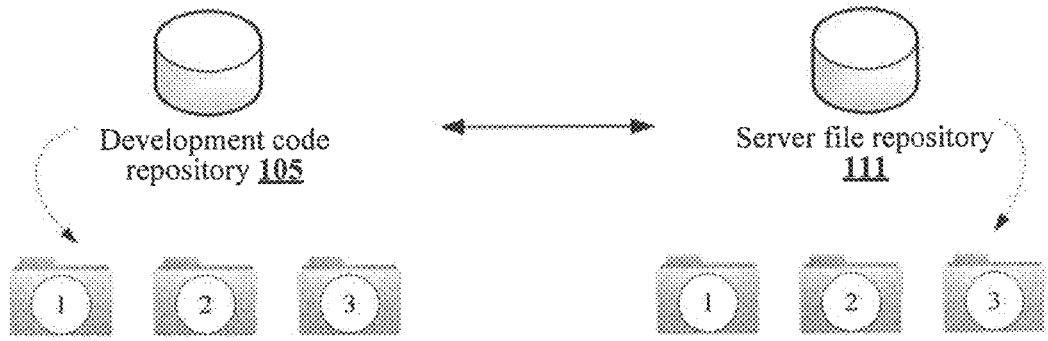
FIG. 3C illustrates a process for automatic redeployment of the application upon deleting an existing directory and/or one or more new files in accordance with few embodiments of the present disclosure.
Figure 3C:
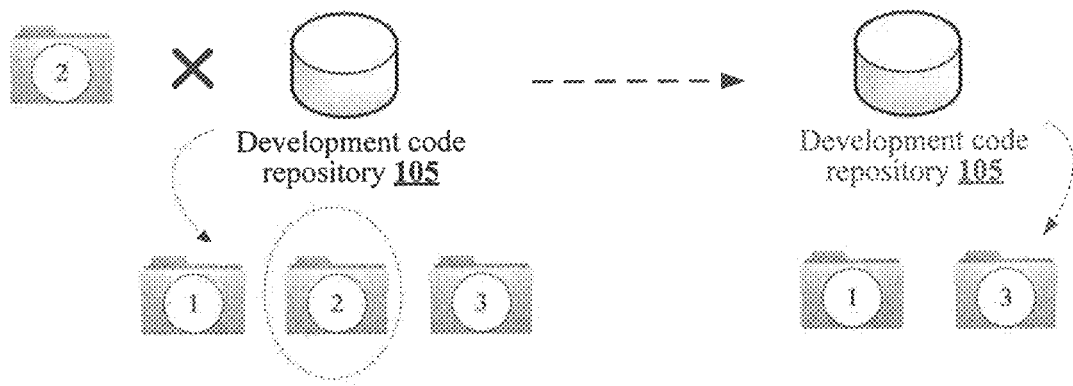
Figure 3C:

FIG. 3C illustrates a process for automatic redeployment of the application when an existing file in the development code repository 105 is deleted.

As shown in step 313 of FIG. 3C, before initiating the redeployment process, both the development code repository 105 and the server file repository 111 comprise same set of directories and files. Further, as shown in step 315 of FIG. 3C, there may be changes in the one or more directories of the development code repository 105 by means of deletion of an existing directory, 'Directory 2' and/or one or more files comprised in 'Directory 2', from the development code repository 105. Hence, in response to the deletion of 'Directory 2' from the development code repository 105, the automatic redeployment agent 107 deletes 'Directory 2' and the one or more files comprised in 'Directory 2' from the server file repository 111 to make both development code repository 105 and server file repository 111 consistent with each other as shown in step 317 of FIG. 3C.

Figure 4:
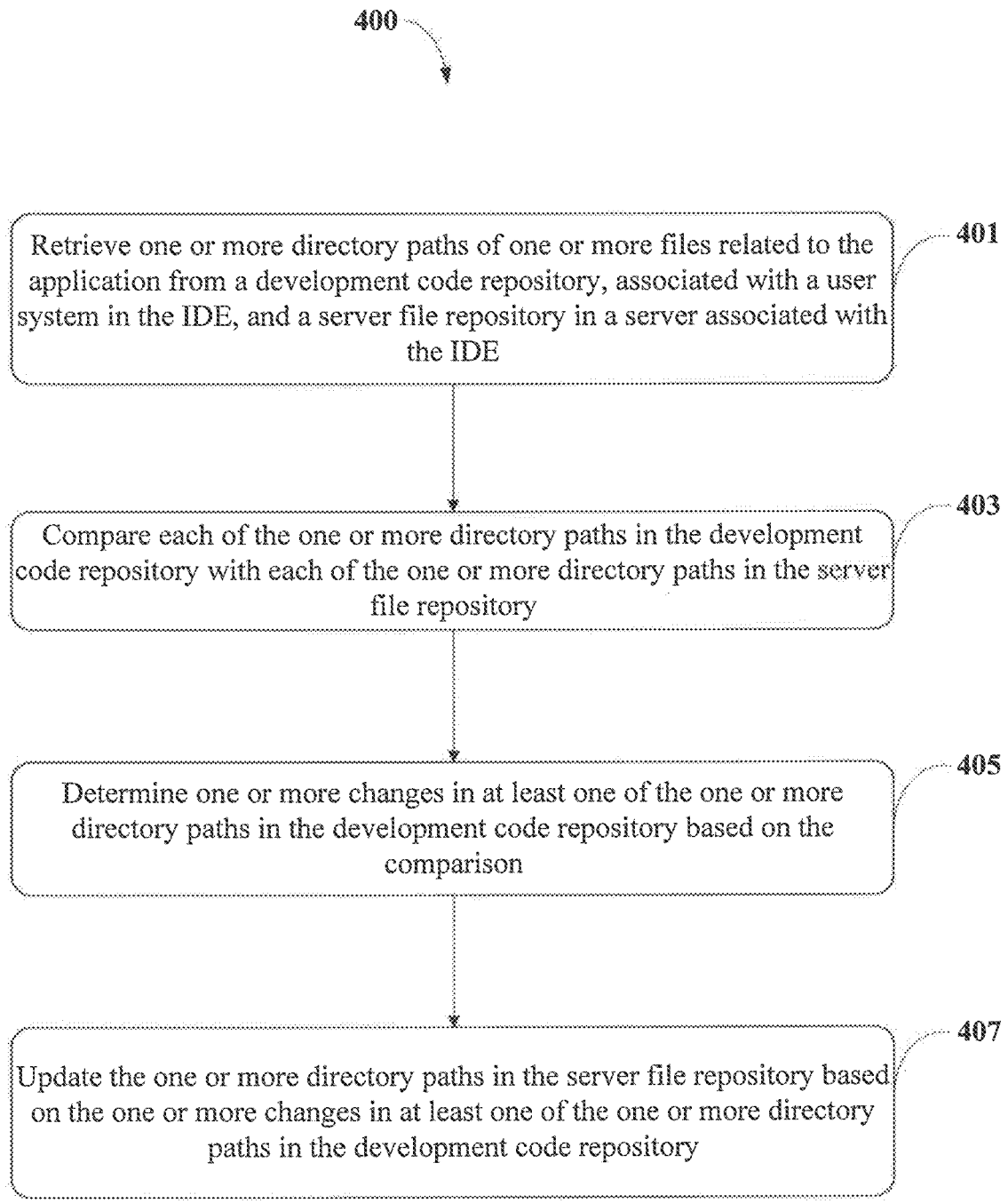
FIG. 4 shows a flowchart illustrating a method for automatic redeployment of applications in an IDE in accordance with some embodiments of the present disclosure.

FIG. 4 shows a flowchart illustrating a method for automatic redeployment of the applications in an IDE in accordance with some embodiments of the present disclosure.

As illustrated in FIG. 4, the method 400 comprises one or more blocks for depicting automatic redeployment of applications in an Integration Development Environment (IDE)

103 using an automatic redeployment agent 107. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the automatic redeployment agent 107 retrieves one or more directory paths of one or more files related to the application from a development code repository 105 and a server file repository 111 in a server 109 associated with the IDE 103. The development code repository 105 may be associated with a user system 101 in the IDE 103.

At block 403, the automatic redeployment agent 107 compares each of the one or more directory paths in the development code repository 105 with each of the one or more directory paths in the server file repository 111. In an embodiment, the automatic redeployment agent 107 also compares values of the one or more files in the server file repository 111 with values of the one or more files in the development code repository 105 for updating the one or more files in the server file repository 111. The values of the one or more files in the development code repository 105 may change based on one or more changes in contents of the one or more files in the development code repository 105.

At block 405, the automatic redeployment agent 107 determines one or more changes in at least one of the one or more directory paths in the development code repository 105 based on the comparison. In an embodiment, the one or more changes includes at least one of addition of one or more new directories and new files into the development code repository 105, deletion of one or more directories or files from the development code repository 105 and change in the values of the one or more files in the development code repository 105.

At block 407, the automatic redeployment agent 107 updates the one or more directory paths in the server file repository 111 based on the one or more changes in at least one of the one or more directory paths in the development code repository 105. Updating the one or more directory paths in the server file repository 111 comprises the steps of copying the one or more new directories and new files into the server file repository 111, deleting the one or more directories or files from the server file repository 111 and updating the values of the one or more files in the server file repository 111. Here, the values of the one or more files in the server file repository 111 is updated by copying only changed contents of the one or more files in the development code repository 105 into the one or more files in the server file repository 111. In an embodiment, the one or more directory paths in the server file repository 111 are updated at one or more predetermined time intervals or upon determining the one or more changes in at least one of the one or more directory paths in the development code repository 105.

Computer System

Figure 5:
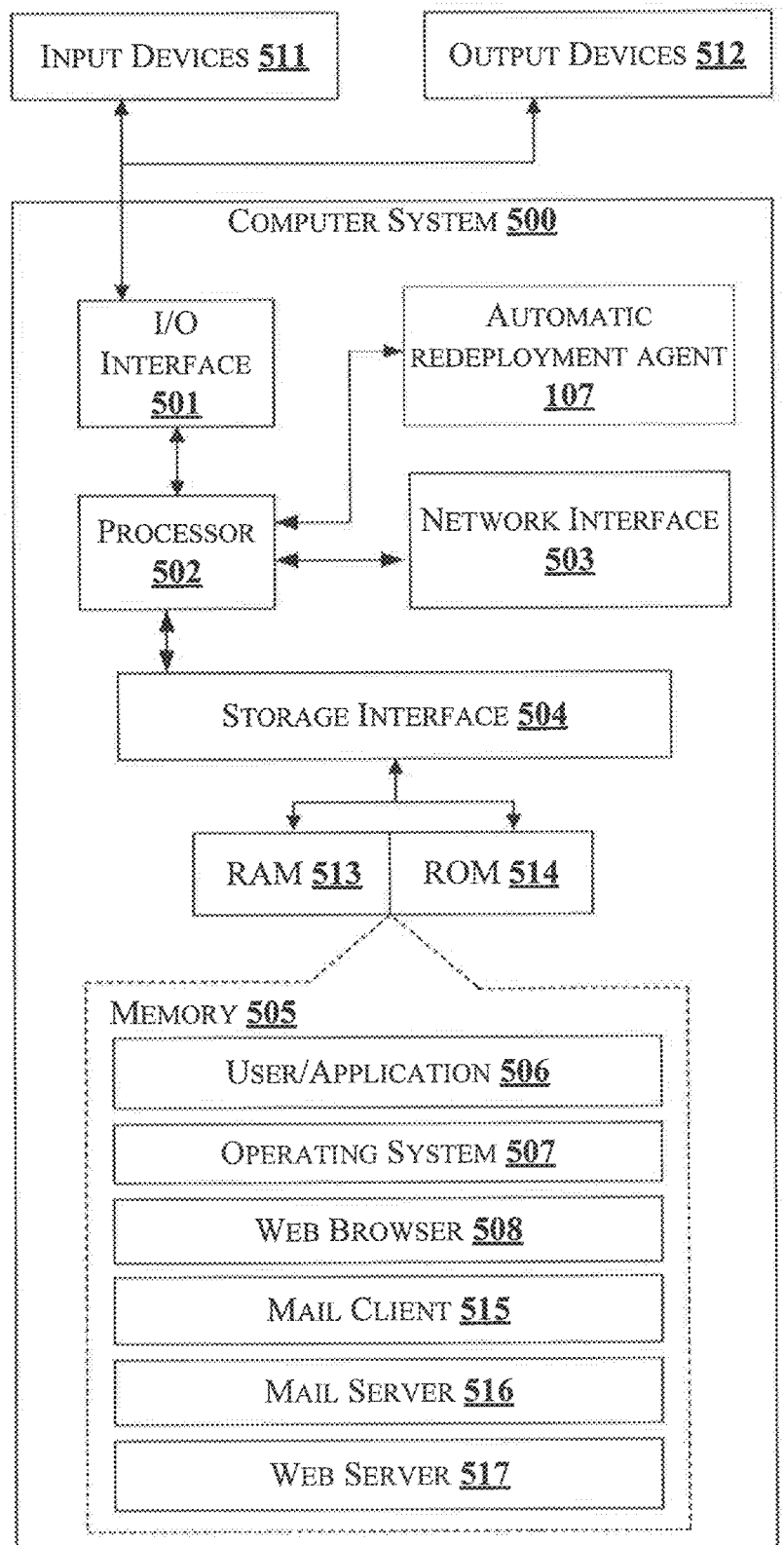
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be the user system 101 which is used by a developer for carrying out one or more changes in the application. The computer system 500 may be configured with the automatic redeployment agent 107 for achieving automatic redeployment of the applications being developed and deployed in an Integrated Development Environment (IDE) 103 in the user system 101. The automatic redeployment agent 107 may be configured as a plug in to the IDE 103.

The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512). The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc.

The memory 505 may store a collection of program or database components, including, without limitation, user/application data 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions, Linux distributions etc. A user interface may facilitate, display, execution, interaction, manipulation, or operation of program components forough textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows Aero, Metro, etc.), or the like.

In some embodiments, the computer system 500 may implement a web browser 508 stored program components. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft. Exchange, or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure discloses a method for automatically redeploying applications in an Integrated Development Environment (IDE).

In an embodiment, the method of present disclosure helps in reducing the deployment and server restart turnaround time by instantly loading the changes to the server.

In an embodiment, the method of present disclosure helps to enhance the overall productivity of the IDE by significantly reducing the efforts required for deployment and/or redeployment of the application.

In an embodiment, the method of present disclosure results in optimal usage of resources in the IDE, thereby reducing the cost of development and deployment of the applications.

In an embodiment, the method and automatic redeployment agent of the present disclosure may be implemented and used for any Java (/J2EE) related projects and/or applications.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate or not) may be used in place of a single device/article. Similarly, where more than one device or article is described herein (whether they cooperate or not), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | User system |
| 103 | Integrated Development Environment (IDE) |
| 105 | Development code repository |
| 107 | Automatic redeployment agent |
| 109 | Server |
| 111 | Server file repository |
| 201 | I/O Interface |
| 203 | Processor |
| 205 | Memory |
| 207 | Modules |
| 208 | Data |
| 209 | File values |
| 211 | Other data |
| 215 | Receiving module |
| 217 | Directory mapping module |
| 219 | Directory update module |
| 221 | Other modules |

What is claimed is:

1. A method for automatic redeployment of an application in an Integrated Development Environment (IDE), the method comprising:

retrieving, by an automatic redeployment agent, one or more directory paths of one or more files related to the application from a development code repository, associated with the IDE in a user system, and a server file repository in a server associated with the IDE;

comparing, by the automatic redeployment agent, each of the one or more directory paths in the development code repository with each of the one or more directory paths in the server file repository, wherein the comparison is performed using sequential validation processes comprising an addition validation, a deletion validation, and an update validation;

determining, by the automatic redeployment agent, one or more changes in at least one of the one or more directory paths in the development code repository based on the comparison to determine one or more changed directory paths and one or more unchanged directory paths in the development code repository;

updating, by the automatic redeployment agent, the one or more directory paths in the server file repository based on the one or more changes in at least one of the one or more changed directory paths in the development code repository;

comparing, by the automatic redeployment agent, file values of the one or more files in the server file repository with file values of the one or more files in the development code repository corresponding to the one or more unchanged directory paths in the development code repository, wherein a file value of a file from the one or more files is obtained as a sum of numeric values assigned to each character in the file; and updating, by the automatic redeployment agent, the one or more files in the server file repository based on the comparison.

2. The method as claimed in claim 1, wherein the one or more changes includes at least one of addition of one or more new directories and new files into the development code repository, deletion of one or more directories or files from the development code repository and change in the file values of the one or more files in the development code repository.

3. The method as claimed in claim 1, wherein updating the one or more directory paths in the server file repository comprises the steps of:
   copying the one or more new directories and new files into the server file repository;
   deleting the one or more directories or files from the server file repository; and
   updating the values of the one or more files in the server file repository.

4. The method as claimed in claim 3, wherein the file values of the one or more files in the server file repository is updated by copying only changed contents of the one or more files in the development code repository into the one or more files in the server file repository.

5. The method as claimed in claim 1, wherein the file values of the one or more files in the development code repository change based on one or more changes in contents of the one or more files in the development code repository.

6. The method as claimed in claim 1, wherein the one or more directory paths in the server file repository, are updated at one or more predetermined time intervals or upon determining the one or more changes in at least one of the one or more directory paths in the development code repository.

7. An automatic redeployment agent for automatic redeployment of an application in an integrated Development Environment (IDE), the automatic redeployment agent comprising:
   a processor; and
   a memory, communicatively coupled to the processor, wherein the memory stores processor-executable instructions, which, on execution, causes the processor to:
      retrieve one or more directory paths of one or more files related to the application from a development code repository, associated with the IDE in a user system, and a server file repository in a server associated with the IDE;
      compare each of the one or more directory paths in the development code repository with each of the one or more directory paths in the server file repository, wherein the comparison is performed using sequential validation processes comprising an addition validation, a deletion validation, and an update validation;
      determine one or more changes in at least one of the one or more directory paths in the development code repository based on the comparison to determine one or more changed directory paths and one or more unchanged directory paths in the development code repository;
      update the one or more directory paths in the server file repository based on the one or more changes in at least one of the one or more changed directory paths in the development code repository;
      compare file values of the one or more files in the server file repository with file values of the one or more files in the development code repository corresponding to the one or more unchanged directory paths in the development code repository, wherein a file value of a file from the one or more files is obtained as a sum of numeric values assigned to each character in the file; and
      update the one or more files in the server file repository, based on the comparison.

8. The automatic redeployment agent as claimed in claim 7, wherein the one or more changes include at least one of addition of one or more new directories and new files into the development code repository, deletion of one or more directories or files from the development code repository and change in the file values of the one or more files in the development code repository.

9. The automatic redeployment agent as claimed in claim 7, wherein to update the one or more directory paths, the instructions causes the processor to:
   copy the one or more new directories and new files into the server file repository;
   delete the one or more directories or files from the server file repository; and
   update the values of the one or more files hi the server file repository.

10. The automatic redeployment agent as claimed in claim 9, wherein the instructions causes the processor to update the file values of the one or more files in the server file repository by copying the one or more changes in contents of the one or more files in the development code repository to the one or more files in the server file repository.

11. The automatic redeployment agent as claimed in claim 7, wherein the instructions causes the processor to change the file values of the one or more files in the development code repository based on one or more changes in contents of the one or more files in the development code repository.

12. The automatic redeployment agent as claimed in claim 7, wherein the instructions causes the processor to update one or more directory paths in the server file repository at one or more predetermined time intervals or upon determining the one or more changes in at least one of the one or more directory paths in the development code repository.

* * * * *